(12) United States Patent
Levin et al.

(10) Patent No.: US 9,373,074 B2
(45) Date of Patent: Jun. 21, 2016

(54) METHOD AND APPARATUS FOR TIME MANAGEMENT AND SCHEDULING FOR SYCHRONOUS PROCESSING ON A CLUSTER OF PROCESSING NODES

(71) Applicant: QUALCOMM Incorporated, San Diego, CA (US)

(72) Inventors: Jeffrey A. Levin, San Diego, CA (US); Venkat Rangan, San Diego, CA (US); Robert J. Vachon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 773 days.

(21) Appl. No.: 13/647,772

(22) Filed: Oct. 9, 2012

(65) Prior Publication Data

US 2014/0101661 A1    Apr. 10, 2014

(51) Int. Cl.
*G06F 9/46*     (2006.01)
*G06N 3/04*     (2006.01)
*G06F 9/50*     (2006.01)
*G06N 3/10*     (2006.01)
*G06F 9/48*     (2006.01)
*G06F 9/52*     (2006.01)

(52) U.S. Cl.
CPC .............. *G06N 3/049* (2013.01); *G06F 9/5038* (2013.01); *G06N 3/10* (2013.01); *G06F 9/4881* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 6,438,573 B1 * | 8/2002 | Nilsen | 718/100 |
| 6,694,345 B1 * | 2/2004 | Brelsford et al. | 718/100 |
| 7,187,968 B2 | 3/2007 | Wolf et al. | |
| 7,322,033 B2 * | 1/2008 | Ito | G06F 9/4887 718/100 |
| 8,214,836 B1 * | 7/2012 | Markov | 718/103 |
| 8,296,419 B1 * | 10/2012 | Khanna | G06F 9/5072 709/201 |
| 8,700,924 B2 * | 4/2014 | Mian | G01D 9/005 370/311 |
| 8,848,584 B2 * | 9/2014 | Shin | H04J 3/0679 370/303 |
| 8,959,518 B2 * | 2/2015 | Eriksson | G06F 9/4843 718/102 |
| 2004/0019624 A1 * | 1/2004 | Sukegawa | 709/201 |
| 2005/0066330 A1 * | 3/2005 | Kanai et al. | 718/102 |
| 2005/0152330 A1 | 7/2005 | Stephens et al. | |
| 2006/0218558 A1 * | 9/2006 | Torii et al. | 718/107 |
| 2007/0274227 A1 * | 11/2007 | Rauscher | H04L 12/2697 370/252 |
| 2008/0154816 A1 * | 6/2008 | Xiao et al. | 706/15 |
| 2008/0208372 A1 * | 8/2008 | Pannese | 700/48 |
| 2009/0089560 A1 * | 4/2009 | Liu et al. | 712/226 |

(Continued)

OTHER PUBLICATIONS

Brette R., et al., "Simulation of networks of spiking neurons: a review of tools and strategies", Journal of Computational Neuroscience, vol. 23, No. 3, Jul. 12, 2007, pp. 349-398, XP019552702, DOI: 10.1007/S10827-007-0038-6 the whole document.

(Continued)

*Primary Examiner* — Hiren Patel
(74) *Attorney, Agent, or Firm* — Rupit M. Patel (57) ABSTRACT

Certain aspects of the present disclosure provide techniques for time management and scheduling of synchronous neural processing on a cluster of processing nodes. A slip (or offset) may be introduced between processing nodes of a distributed processing system formed by a plurality of interconnected processing nodes, to enable faster nodes to continue processing without waiting for slower nodes to catch up. In certain aspects, a processing node, after completing each processing step, may check for received completion packets and apply a defined constraint to determine whether it may start processing a subsequent step or not.

20 Claims, 6 Drawing Sheets

(56) References Cited

U.S. PATENT DOCUMENTS

| | | | |
|---|---|---|---|
| 2009/0254913 A1* | 10/2009 | Kawano et al. | 718/103 |
| 2009/0313195 A1 | 12/2009 | McDaid et al. | |
| 2010/0125847 A1* | 5/2010 | Hayashi | 718/102 |
| 2010/0153955 A1* | 6/2010 | Sirota et al. | 718/102 |
| 2010/0180003 A1* | 7/2010 | Jiang | G06Q 10/06 709/208 |
| 2010/0186020 A1* | 7/2010 | Maddhirala et al. | 718/105 |
| 2011/0106741 A1 | 5/2011 | Denneau et al. | |
| 2011/0138397 A1* | 6/2011 | Kikuchi | 718/106 |
| 2012/0198462 A1* | 8/2012 | Cham et al. | 718/103 |
| 2012/0254881 A1* | 10/2012 | Hamamoto et al. | 718/102 |
| 2013/0047164 A1* | 2/2013 | Ujibashi | 718/104 |
| 2013/0104140 A1* | 4/2013 | Meng et al. | 718/104 |
| 2013/0144973 A1* | 6/2013 | Li et al. | 709/217 |
| 2014/0032458 A1* | 1/2014 | Sinyavskiy et al. | 706/16 |
| 2014/0043962 A1* | 2/2014 | Rangan | H04L 41/0668 370/228 |

OTHER PUBLICATIONS

Cessac B., et al., "Introducing numerical bounds to improve event-based neural network simulation", arXiv: 0810.3992v2, Mar. 20, 2009, XP055102571, Retrieved from the Internet: URL:http://arxiv.org/abs/0810.3992v2 [retrieved on Feb. 14, 2014] Sections 1 and 2.

International Search Report and Written Opinion—PCT/US2013/064001—ISAEPO—Mar. 12, 2014.

Mouraud A., et al., "Simulation of large spiking neural networks on distributed architectures, The "DAMNED" simulator", Communications in Computer and Information Science, vol. 43, Aug. 27, 2009, pp. 359-370, XP055102558, DOI: 10-1007/978-3-642-03969-0_33.

Stewart R.D., et al., "Spiking neural network simulation: memory-optimal synaptic event scheduling", Journal of Computational Euroscience, vol. 30, No. 3, Nov. 3, 2010, pp. 721-728, XP019912205, DOI: 10.1007/S10827-010-0288-6 Sections 1 and 2.

Taouali W., et at., "No clock to rule them all", Journal of Physiology—Paris, vol. 105, No. 1-3, Sep. 12, 2011, pp. 83-90, XP028126564, DOI: 10.1016/j.jphysparis.2011.08.005 Sections 4 and 5.

Grassman, et al., "Distributed Event Driven Simulation of Spiking Neural Networks," Dipl.-Ing. Cyprian Grassmann, Prof. Dr. Joachim K. Anlauf, 1998, 6 pgs.

* cited by examiner

METHOD AND APPARATUS FOR TIME MANAGEMENT AND SCHEDULING FOR SYCHRONOUS PROCESSING ON A CLUSTER OF PROCESSING NODES

BACKGROUND

1. Field

Certain aspects of the present disclosure generally relate to distributed computing systems and, more particularly, to a method and apparatus for time management and scheduling for synchronous processing on a cluster of processing nodes.

2. Background

An artificial neural network is a mathematical or computational model composed of an interconnected group of artificial neurons (i.e., neuron models). Artificial neural networks may be derived from (or at least loosely based on) the structure and/or function of biological neural networks, such as those found in the human brain. Because artificial neural networks can infer a function from observations, such networks are particularly useful in applications where the complexity of the task or data makes designing this function by hand impractical.

One type artificial neural network is the spiking neural network, which incorporates the concept of time into its operating model, as well as neuronal and synaptic state, thereby increasing the level of realism in this type of neural simulation. Spiking neural networks are based on the concept that neurons fire only when a membrane potential reaches a threshold. When a neuron fires, it generates a spike that travels to other neurons which, in turn, raise or lower their membrane potentials based on this received spike.

A neural processing system typically includes a plurality of processing nodes with each processing node connected to one or more other processing nodes. In certain aspects, a large neural simulation may need to be distributed across multiple nodes. A distributed simulation may require nodes to keep in sync with each other and avoid running too fast or too slow in order to prevent data loss. Further, nodes should be able to communicate in the same time scale.

In certain aspects, each node may increment its time on receiving an indication from every other node in the processing system that a current processing step is completed, and then start a subsequent processing step. Thus, the slowest node typically governs the time increments, and thus, processing by other nodes.

SUMMARY

Certain aspects of the present disclosure provide a method for processing by a first node in a distributed computing system formed by a plurality of interconnected nodes. The method generally includes monitoring completion of jobs by other nodes in the distributed computing system, and determining, after completing processing of a job in a current time interval, whether or not to start processing a job in a subsequent time interval based on at least one constraint and the monitored completion of jobs by other nodes.

Certain aspects of the present disclosure provide an apparatus for processing by a first node in a distributed computing system formed by a plurality of interconnected nodes. The apparatus generally includes means for monitoring completion of jobs by other nodes in the distributed computing system, and means for determining, after completing processing of a job in a current time interval, whether or not to start processing a job in a subsequent time interval based on at least one constraint and the monitored completion of jobs by other nodes.

Certain aspects of the present disclosure provide an apparatus for processing by a first node in a distributed computing system formed by a plurality of interconnected nodes. The apparatus generally includes at least one processor configured to monitor completion of jobs by other nodes in the distributed computing system, and determining, after completing processing of a job in a current time interval, whether or not to start processing a job in a subsequent time interval based on at least one constraint and the monitored completion of jobs by other nodes.

Certain aspects of the present disclosure provide a computer program product for processing by a first node in a distributed computing system formed by a plurality of interconnected nodes, comprising instructions. The instructions are generally executable by one or more for monitoring completion of jobs by other nodes in the distributed computing system, and determining, after completing processing of a job in a current time interval, whether or not to start processing a job in a subsequent time interval based on at least one constraint and the monitored completion of jobs by other nodes.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
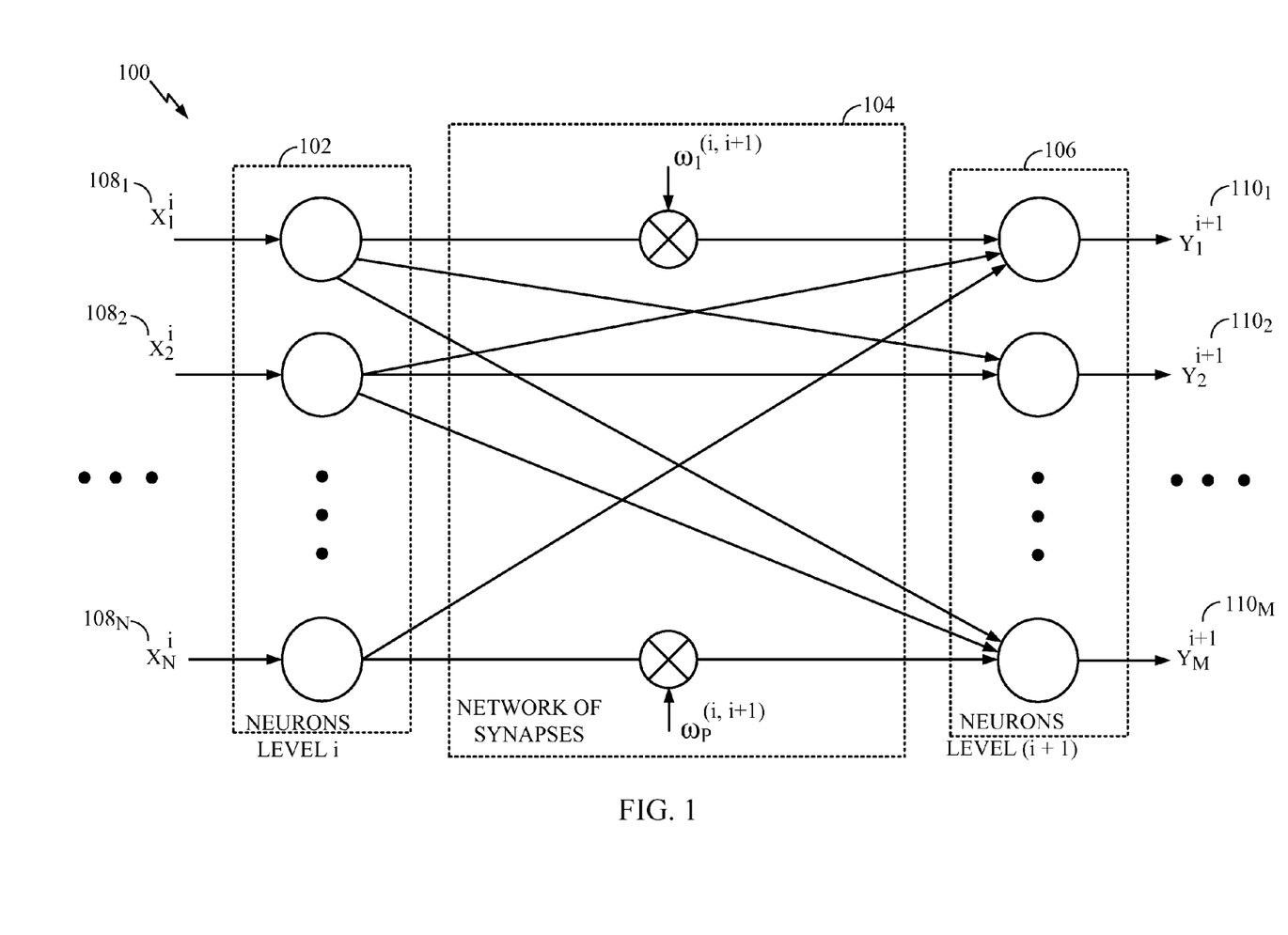
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 is just one example of a distributed computing system with interconnected nodes in which aspects of the present disclosure may be practiced.

The neural system 100 may comprise a level of neurons 102 connected to another level of neurons 106 though a network of synaptic connections 104. For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104), and scale those signals according to adjustable synaptic weights $w_1^{(i,i+1)}, \ldots, w_P^{(i,i+1)}$ (where P is a total number of synaptic connections between the neurons of levels 102 and 106). Further, the scaled signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Time Management and Scheduling of Synchronous Neural Processing on a Cluster of Processing Nodes A neural processing system is one example of a distributed processing system with a plurality of interconnected processing nodes. In certain aspects, a large neural simulation may need to be distributed across multiple nodes. A distributed simulation may require nodes to keep in sync with each other and avoid running too fast or too slow in order to prevent data loss. Further, nodes should be able to communicate in the same time scale.

In certain aspects, synchronization between nodes may be achieved using "spike packets" which generally convey a time of generation of the packet. The time of generation may be a timestamp by the source of the spike packet corresponding to the time the spikes were generated. In further aspects, there may exist a transport delay involved from the time the packet was generated until it is used by a destination. Each node may decide whether it should undertake a subsequent processing step based on the receipt of spike packets from one or more other nodes, the transport delays involved, priority of processing jobs, other constraints etc. In some cases, at least one of the constraints prevents a first node from processing a job in the subsequent time interval before at least a second node has begun processing a job in an interval later than the subsequent time interval.

A naïve implementation of synchronization across the nodes may include using a time keeping resource to track global time. A first node may complete a processing job (or step) and may send a signal to the timekeeper indicating that it has completed the processing job. The signal may include a spike packet. The timekeeper may direct processing of other nodes based on the signal received from the first node. For example, on receiving the signaling indicating completion of a current processing job by the first node, the timekeeper may direct other nodes to increment their times and start processing a subsequent processing job. This naïve implementation has limitations. For example, this method may be slow and non-robust to failures of the timekeeper. Further, the slowest node typically governs the time increments, and thus, processing by other nodes.

In certain aspects, distributed timekeeping may be used, in which nodes may maintain their own time. In an aspect, the time maintained by each node is relative time, relative to other nodes and not absolute time. In distributed timekeeping, each node may increment its time on receiving an indication (e.g. via a spike packet) from every other node in the processing system that a current processing step is completed, and then start a subsequent processing step. Again, the slowest node typically governs the time increments, and thus, processing by other nodes.

Figure 2:
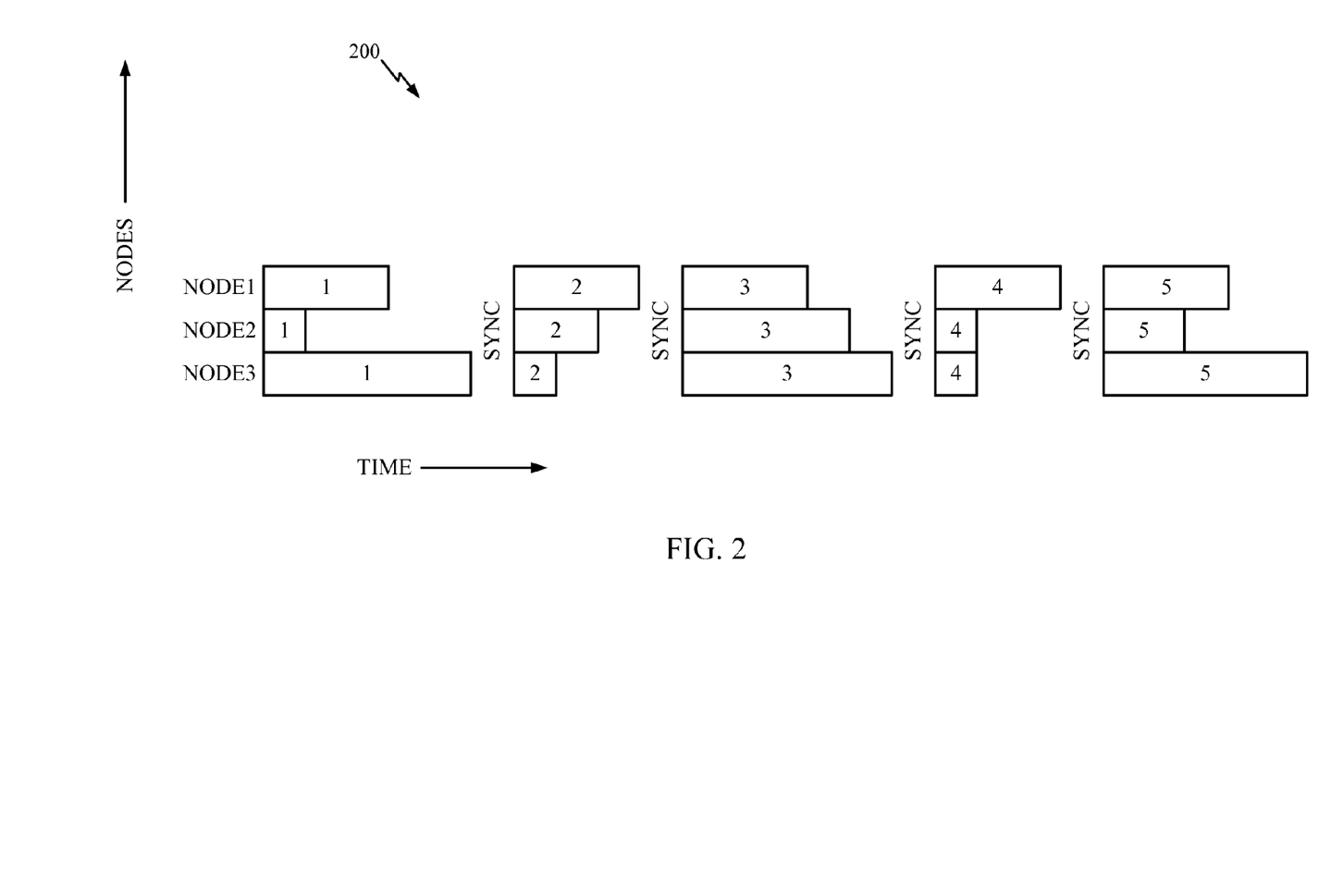
FIG. 2 illustrates a timing diagram for a distributed processing system with synchronized processing nodes in accordance with certain aspects of the present disclosure.

FIG. 2 illustrates a timing diagram 200 for distributed processing system with synchronized processing nodes in accordance with certain aspects of the present disclosure. In FIG. 2, the x-axis represents time and the y-axis represents processing nodes. The timing diagram 200 shows execution of processing steps (or jobs, events etc.) 1-5 by each processing Node 1-3. As shown in FIG. 2, each of the processing Nodes 1-3 waits for every other processing node to complete processing a current processing step before processing a next processing step. For example, although processing Node 2 completes processing step 1 before Nodes 1 and 3 complete processing their step 1, Node 2 waits for Nodes 1 and 3 to complete step 1 before starting to process step 2. In certain aspects, this may be achieved by each processing node 1-3 sending a unidirectional message to every other node indicating completion of a current processing step and a constraint at each receiving node that it would not start to process a subsequent step until it receives a completion packet for the current step from all other nodes. As noted above, each processing node may send packets (e.g. spike packets) to other nodes indicating completion of a current processing step. Each node may wait until it receives a completion packet from every other node before it may start a subsequent processing step. However, one or more nodes slowing down or stalling briefly for whatever reason may affect processing by all other nodes and may slow down the processing system.

In certain aspects, a slip (or offset) S may be introduced between the processing nodes to enable faster nodes to continue processing without waiting for slower nodes to catch up. The slip may include a time delay or a processing step delay. Further, a constraint may defined such that a node N2 receiving completion packets from another node N1 may not start processing unless:

$$I_{N1}+S \geq I_{N2} \quad (1)$$

where, $I_{N1}$ is an index indicating a number of processing steps completed by N1, S indicates a number of processing steps N2 is allowed to be ahead/or must be behind of N1, and $I_{N2}$ is an index indicating a current number of processing steps completed by N2

Thus, according to the constraint in equation (1), N2 may not be allowed to continue processing a subsequent processing step until the time of the current packet from N1 plus the slip S is greater than or equals the current time of N2. In certain aspects, $I_{N1}$ and $I_{N2}$ may be non-negative integers. In certain aspects, S may take any integer value. Given the constraint of equation (1), a positive value of S indicates that N2 is allowed to be S processing steps ahead of N1. A negative S indicates that N2 must be S processing steps behind N1. A slip value of zero means that N2 may not start a subsequent step until it receives the completion packet for a current step from N1. A value of the slip S may be set based on at least one of relative processing speeds of the processing nodes, transport delay between nodes, a maximum allowed delay (threshold) between nodes, and other considerations.

In certain aspects, a processing node, after completing each processing step, may check for received completion packets (indicating another node has completed their processing for a given time interval) and apply a defined constraint (e.g. Equation 1) to determine whether it may start processing a subsequent step or not.

Figure 3:
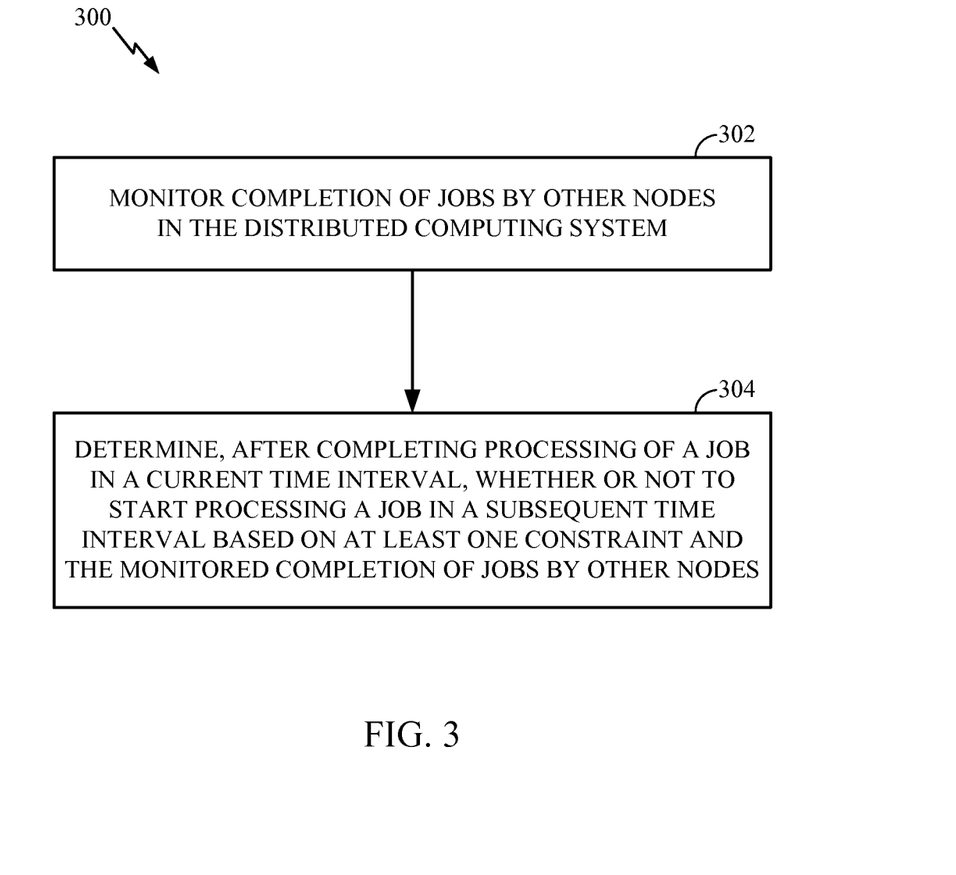
FIG. 3 is a flow diagram illustrating operations for processing by a first node in a distributed computing system formed by a plurality of interconnected nodes, in accordance with certain aspects of the present disclosure.

FIG. 3 is a flow diagram illustrating example operations 300 for processing with "slip timing", in accordance with certain aspects of the present disclosure. The operations 300 may be performed, for example, by a first node in a distributed computing system formed by a plurality of interconnected nodes. In a neuro-morphic computing system, for example, the operations 300 may be performed by each of the neurons in level 102 or level 110.

Operations 300 begin, at 302, by monitoring completion of jobs by other nodes in the distributed computing system. In some cases, monitoring completion of jobs by other nodes may involve receiving an indication from other nodes reporting completion of jobs.

At 304, the first node determines, after completing processing of a job in a current time interval, whether or not to start processing a job in a subsequent time interval based on at least one constraint and the monitored completion of jobs by other nodes. In some cases, a constraint may be defined by a value that specifies a maximum number of time intervals the first node is allowed to process ahead of the second node.

Figure 4:
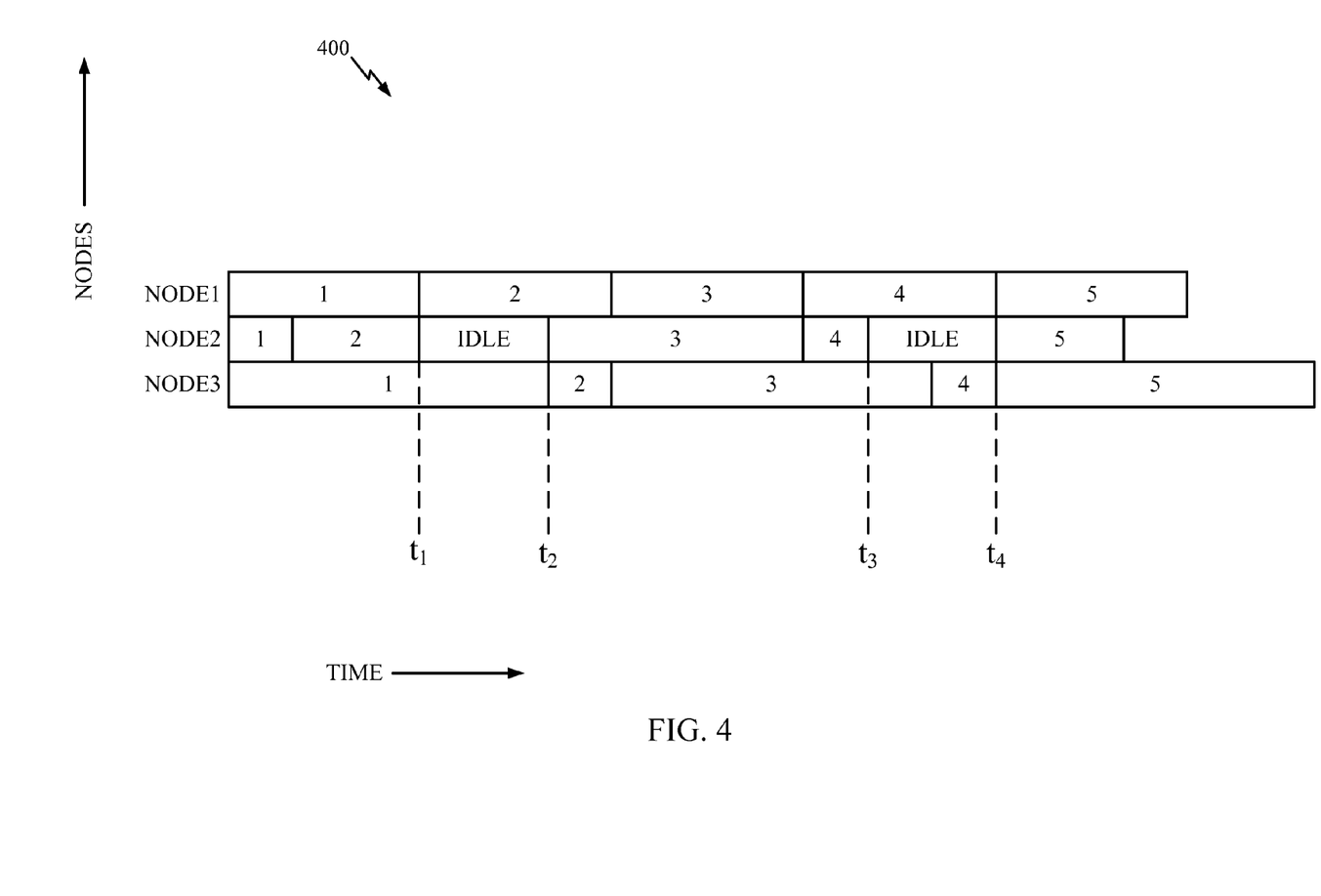
FIG. 4 illustrates a timing diagram for an example distributed processing system with slips applied between synchronized processing nodes, in accordance with certain aspects of the present disclosure.

FIG. 4 illustrates a timing diagram 400 for an example distributed processing system with slips applied between synchronized processing nodes, in accordance with certain aspects of the present disclosure. In the example of FIG. 4 Node 1 is allowed to be no more than two processing steps ahead of Node 2 (S=2), Node 2 is allowed to be no more than 1 processing step ahead of Node 3 (S=1), and Node 3 is allowed to be no more than 2 processing steps ahead of Node 1 (S=1).

According to certain aspects, each of the processing Nodes 1-3, after completing each processing step, checks for received completion packets and applies the defined constraint (e.g. Equation 1) to determine whether it may start processing a subsequent step or not. If a processing node determines that it may not yet start processing a subsequent processing step, it may switch to an IDLE state where it may periodically check for the received completion packets and start processing the subsequent step when the condition of constraint is fulfilled.

In the example of FIG. 4, Node 1 only listens to Node 2 for completion packets, Node 2 only listens to Node 3 for completion packets and Node 3 only listens to Node 1 for completion packets. As shown in FIG. 4, when Node 2 completes processing step 2 at time t1, it checks for completion packets received from Node 3 to determine a current processing state of Node 3. As Node 3 is still processing step 1 at t1 and Node 2 is allowed to be no more than one processing step ahead of Node 3, Node 2 IDLEs until it receives a packet indicating that Node 3 has completed step 1 at t2 and then starts processing step 3 at t2. Similarly, Node 2 stalls at t3 after completing step 4 until Node 3 finishes step 4 at t4 and then starts processing step 5 at t4. Nodes 1 does not IDLE as it is never more than two ahead of Node 2 and Node 3 does not IDLE as it is never more than two ahead of Node 1.

Figure 5:
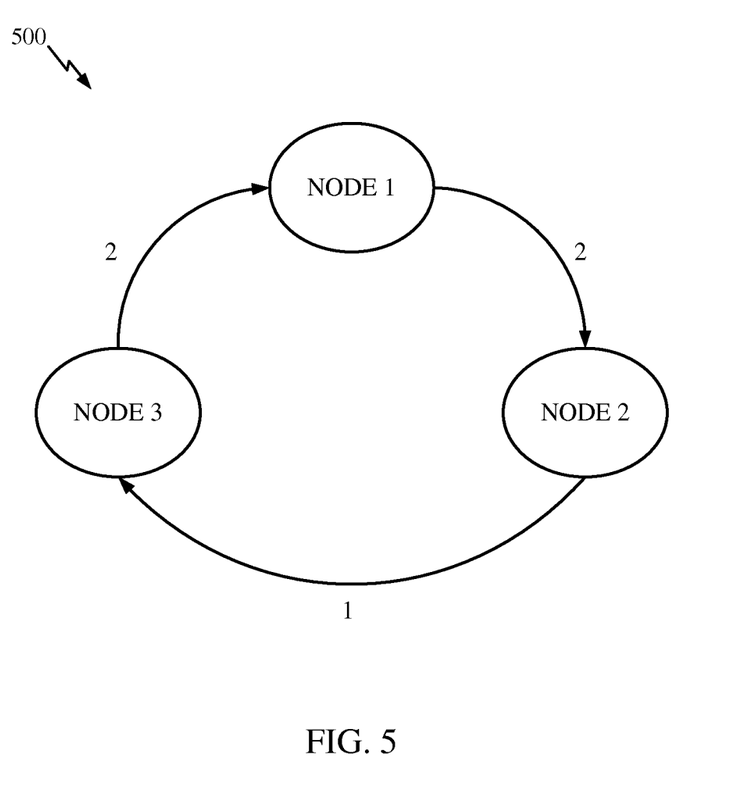
FIG. 5 illustrates a processing loop for the timing diagram of FIG. 4, in accordance with certain aspects of the present disclosure.

FIG. 5 illustrates a processing loop 500 for the timing diagram 400 of FIG. 4, in accordance with certain aspects of the present disclosure. The processing loop 500 shows Nodes 1-3 and arrows connecting the nodes indicating the direction of flow of the completion packets. For example, as shown in FIG. 5, Node 1 sends completion packets to Node 2, Node 2 sends completion packets to Node 3 and Node 3 sends completion packets to Node 1. The number at each connection shows the value of slip S. The total loop slip or total loop delay for the illustrated example is 2+2+1=5.

In certain aspects, the value of the total loop slip indicates the amount of overlap between processing steps of the various nodes in a processing system. In certain aspects, a total loop delay of zero would mean that the nodes would settle out at a constant delay between nodes without any substantial overlap between processing steps. However, a total loop slip of 1 or above may lead to an overlap in the processing steps. Higher the value of the total loop slip, more may be the overlap in the processing steps. In certain aspects, the total loop slip may be maintained at a non-negative value to avoid deadlocks.

In certain aspects, it may take a certain amount of time, often referred to as transport delay, to convey information (packets) between nodes, for example due to physical constraints. In certain aspects, the transport delay between two nodes may be added to the slip value between the two nodes to account for the transport delay.

The examples of FIGS. 4 and 5 are for illustrative purposes only and for easy understanding of the underlying concepts. It may be appreciated that a node may receive completion packets from multiple nodes and may determine processing based on constraints taking into account processing by the multiple nodes. Further, multiple processing loops may be present between the same nodes.

Figure 6:
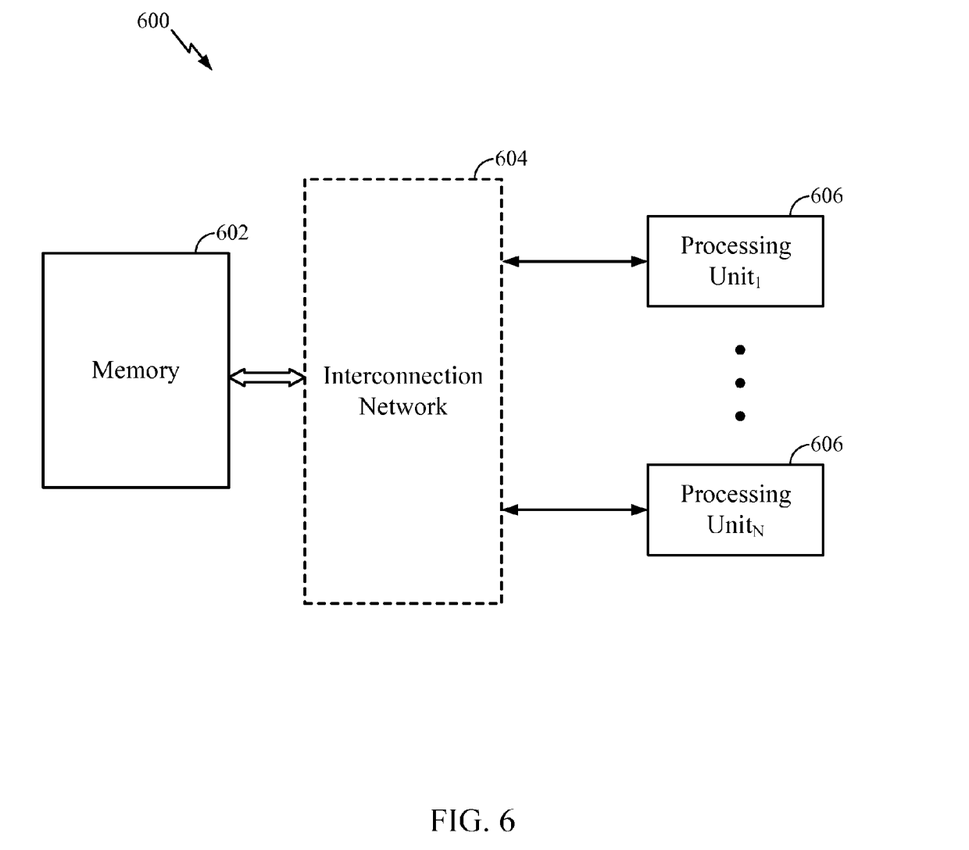
FIG. 6 illustrates an example implementation of time management and scheduling of synchronous processing where a memory may be interfaced with individual distributed processing units in accordance with certain aspects of the present disclosure.

FIG. 6 illustrates an example implementation 600 of the aforementioned method for time management and scheduling of synchronous neural processing where a memory 602 may be interfaced via an interconnection network 604 with individual (distributed) processing units (neural processors) 606 of a computational network (neural network) in accordance with certain aspects of the present disclosure. One or more weights associated with one or more connections (synapses) of the computational network (neural network) may be loaded from the memory 602 via connection(s) of the interconnection network 604 into each processing unit (neural processor) 506. In an aspect of the present disclosure, the processing unit 606 may be configured to monitor completion of jobs by nodes in a distributed computing system, and determine, after completing processing a job by a first node in a current time interval, whether or not to start processing a job in a subsequent time interval by the first node based on at least one constraint and the monitored completion of jobs by the other nodes.

Programmable Timeout Value to Avoid Deadlock

Under certain scenarios, such as when a processing node leaves a system unexpectedly ("drops out"), a receiving node may not receive expected packets from that processing node indicating completion of jobs for a current timestamp. This could lead to a deadlock situation if the receiving node were to hold off processing jobs in a subsequent timestamp until receiving these packets from the node that dropped out.

According to certain aspects, however, the receiving node may be programmed with a timeout value. The receiving node may maintain a timer for each connection, initiated with the timeout value. A timeout, when exceeded on a particular connection between any two nodes (e.g., as indicated by expiration of a timer), may then cause the receiver to behave as if it has received all packets for that particular time interval from the corresponding transmitter. The use of this mode may help avoid deadlock in case the packet gets lost in the network.

In addition, the use of such a programmable timeout value may force all processing nodes to run in a well-defined time interval and also be able to detect when nodes leave the system unannounced. A node using this mode can also be classified as having "dropped out" when packets from it do not arrive for more than a programmed amount of time, possibly subject to other modes discussed below.

Implicit Packets

According to certain aspects, a transmitter may not be required to send a packet (completion or "SYNC" packet) every time interval to tell the receiver that it has completed its operation for that current time interval. Rather, the transmitter may wait until a future time interval to send an indication of completion (e.g., a SYNC packet).

In such cases, when the receiver receives a SYNC packet for the future time interval (e.g., $T_f$), it may assume that all packets for the times from the previous (prior) time interval(s) to the future time $T_f$ (identified or indicated in the SYNC packet) have been received in this mode. By not requiring a SYNC packet each time interval, this mode may allow for a reduction in traffic on the network. In addition, this mode may help accommodate scenarios where different types of nodes may have different processing (or spike) rates. For example, a camera may need to send a packet relatively infrequently (e.g., only once every 40 ms) while the rest of the network may need to operate more frequently (e.g., at every 2 ms). Operating in this mode (using implicit packets), the camera would then simply send packets every 40 ms and the network would automatically run for the remaining 40 ms. As a result, this mode may provide great flexibility, allowing different parts of the network to operate at their own timescales.

Timing Adjustment Mechanisms

In some cases, a time drift may exist due to a difference in the local time sources (clocks) for different processing nodes. In fact, it is conceivable that even two networks operating at the same time scale may eventually go out of sync. The use of the timeout and implicit packets, described above, may help form a robust implementation which covers the cases where the receiver clock runs faster or slower than the transmitter and may help prevent a network deadlock.

Other features may also help provide a robust implementation and address differences in timing between transmitting and receiving nodes. For example, according to certain aspects, an Auto-synchronization mode may be provided. In this mode, a node that wants to "join" a pre-existing system may use the first incoming spike timestamp to determine a timing offset required for it to properly receive spikes from the system. Thus, a joining node may determine a timing offset upon joining a network and use this timing offset to adjust its local timing in order to properly process incoming spikes from the system.

In some cases, a connection between two nodes may have an "offset" time, generally defined as the difference between the source and destination timestamps. This offset time may be used to synchronize two nodes together. A node may utilize the time offset to process indications received from other nodes. As an example, if the receiver is programmed with a time offset of 25 and the transmitter is sending spikes for time 10, the receiver may temporarily ignore all communications in this mode until the transmitter catches up. When the transmitter catches up to time 25 (as indicated in timestamps for later packets), the receiver may then start using the communications automatically. This scheme may allow nodes to join an operating network at well defined times in the future. It should be noted that the time offset may be positive or negative, depending on the initial states of the internal time counters in the transmitter and receiver.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, each of the operations 300 illustrated in FIG. 3 may have corresponding means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Bluray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for processing by a first node in a distributed computing system formed by a plurality of interconnected nodes which maintain their own relative time, comprising:
    monitoring completion of jobs by other nodes in the distributed computing system;
    determining, after completing processing of a job in a current time interval of the first node, whether or not to start processing a job in a subsequent time interval of the first node based on at least one constraint and the monitored completion of jobs by other nodes; and
    determining a time offset for a connection between the first node and the second node, based on a difference in timestamps between the first node and at least the second node, wherein each of the timestamps indicates an interval for which a corresponding job is completed by a respective node,
    wherein the at least one constraint is defined by a value that specifies a maximum number of jobs the first node is allowed to process ahead of a second node, and the at least one constraint prevents the first node from processing a job in the subsequent time interval of the first node before at least the second node has begun processing a job in an interval later than a subsequent time interval of the first node adjusted based on the time offset.

2. The method of claim 1, wherein the at least one constraint prevents the first node from processing a job in the subsequent time interval of the first node before at least the second node has begun processing a job in an interval later than the subsequent time interval of the first node.

3. The method of claim 1, wherein monitoring completion of jobs by other nodes comprises receiving an indication from a respective node of the other nodes reporting completion of jobs.

4. The method of claim 3, wherein each of the indications provides a timestamp indicating the interval for which a corresponding job is completed by the respective node of the other nodes sending the indication.

5. The method of claim 3, wherein at least one of the other nodes does not send an indication for each interval.

6. The method of claim 5, further comprising assuming the at least one of the other nodes has completed processing jobs for time intervals prior to a time interval identified in the indication.

7. The method of claim 3, further comprising:
    determining a time offset for the first node based on a timestamp in a first indication received upon joining the distributed computing system; and
    utilizing the time offset to process one or more of the indications received from the respective other nodes.

8. The method of claim 1, further comprising:
    maintaining a programmable timer for at least one connection between the first node and at least the second node;
    wherein at least a first constraint allows the first node to process a job in the subsequent time interval of the first node if the programmable timer expires without receiving an indication from the second node.

9. The method of claim 8, wherein based on at least the first constraint, the first node processes a job in the subsequent time interval if:
    the programmable timer expires without receiving an indication from the second node; or
    the first node receives an indication from the second node prior to the programmable timer expiring.

10. An apparatus for processing by a first node in a distributed computing system formed by a plurality of interconnected nodes which maintain their own relative time, comprising:
    means for monitoring completion of jobs by other nodes in the distributed computing system;
    means for determining, after completing processing of a job in a current time interval of the first node, whether or not to start processing a job in a subsequent time interval of the first node based on at least one constraint and the monitored completion of jobs by other nodes; and
    means for determining a time offset for a connection between the first node and the second node, based on a difference in timestamps between the first node and at least the second node wherein each of the timestamps indicates an interval for which a corresponding job is completed by a respective node,
    wherein the at least one constraint is defined by a value that specifies a maximum number of jobs the first node is allowed to process ahead of a second node, and the at least one constraint prevents the first node from processing a job in the subsequent time interval of the first node before at least the second node has begun processing a job in an interval later than a subsequent time interval of the first node adjusted based on the time offset.

11. The apparatus of claim 10, wherein the at least one constraint prevents the first node from processing a job in the subsequent time interval of the first node before at least the second node has begun processing a job in an interval later than the subsequent time interval of the first node.

12. The apparatus of claim 10, wherein the means for monitoring completion of jobs by other nodes comprises receiving an indication from a respective node of the other nodes reporting completion of jobs.

13. The apparatus of claim 12, wherein each of the indications provides a timestamp indicating the interval for which a corresponding job is completed by the respective node of the other nodes sending the indication.

14. The apparatus of claim 12, wherein at least one of the other nodes does not send an indication for each interval.

15. The apparatus of claim 14, further comprising means for assuming the at least one of the other nodes has completed processing jobs for time intervals prior to a time interval identified in the indication.

16. The apparatus of claim 12, further comprising:
    means for determining a time offset for the first node based on a timestamp in a first indication received upon joining the distributed computing system; and
    means for utilizing the time offset to process one or more of the indications received from the respective other nodes.

17. The apparatus of claim 10, further comprising:
    means for maintaining a programmable timer for at least one connection between the first node and at least the second node;
    wherein at least a first constraint allows the first node to process a job in the subsequent time interval of the first node if the programmable timer expires without receiving an indication from the second node.

18. The apparatus of claim 17, wherein based on at least the first constraint, the first node processes a job in the subsequent time interval if:

the programmable timer expires without receiving an indication from the second node; or the first node receives an indication from the second node prior to the programmable timer expiring.

19. An apparatus for processing by a first node in a distributed computing system formed by a plurality of interconnected nodes which maintain their own relative time, comprising:

at least one processor configured to monitor completion of jobs by other nodes in the distributed computing system, determine, after completing processing of a job in a current time interval of the first node, whether or not to start processing a job in a subsequent time interval of the first node based on at least one constraint and the monitored completion of jobs by other nodes, and determine a time offset for a connection between the first node and the second node, based on a difference in timestamps between the first node and at least the second node, wherein each of the timestamps indicates an interval for which a corresponding job is completed by a respective node, wherein the at least one constraint is defined by a value that specifies a maximum number of jobs the first node is allowed to process ahead of a second node and the at least one constraint prevents the first node from processing a job in the subsequent time interval of the first node before at least the second node has begun processing a job in an interval later than a subsequent time interval of the first node adjusted based on the time offset; and a memory coupled with the at least one processor.

20. A non-transitory computer readable medium for processing by a first node in a distributed computing system formed by a plurality of interconnected nodes which maintain their own relative time, the non-transitory computer readable medium having instructions stored thereon, the instructions executable by one or more processors for:

monitoring completion of jobs by other nodes in the distributed computing system;

determining, after completing processing of a job in a current time interval of the first node, whether or not to start processing a job in a subsequent time interval of the first node based on at least one constraint and the monitored completion of jobs by other nodes; and determining a time offset for a connection between the first node and the second node, based on a difference in timestamps between the first node and at least the second node, wherein each of the timestamps indicates an interval for which a corresponding job is completed by a respective node, wherein the at least one constraint is defined by a value that specifies a maximum number of jobs the first node is allowed to process ahead of a second node, and the at least one constraint prevents the first node from processing a job in the subsequent time interval of the first node before at least the second node has begun processing a job in an interval later than a subsequent time interval of the first node adjusted based on the time offset.

* * * * *